United States Patent [19]
Kurtz et al.

[11] Patent Number: 5,825,552
[45] Date of Patent: Oct. 20, 1998

[54] BEAMSPLITTER/STAGGERER FOR MULTI-BEAM LASER PRINTERS

[75] Inventors: Andrew F. Kurtz, Rochester; John R. Debesis, Penfield; Sanwal P. Sarraf, Pittsford, all of N.Y.

[73] Assignee: Eastman Kodak Company, Rochester, N.Y.

[21] Appl. No.: 885,307

[22] Filed: Jun. 30, 1997

Related U.S. Application Data

[63] Continuation-in-part of Ser. No. 427,523, Apr. 24, 1995, Pat. No. 5,646,786.

[51] Int. Cl.$^6$ .................................................. G02B 27/14
[52] U.S. Cl. .......................... 359/629; 359/623; 359/254; 359/321; 359/259; 250/578.1
[58] Field of Search ..................................... 359/629, 619, 359/623, 321, 254, 259, 636, 637, 495; 250/578.1

[56] References Cited

U.S. PATENT DOCUMENTS

| | | | |
|---|---|---|---|
| 4,392,729 | 7/1983 | Tsunefuji | 359/636 |
| 4,960,320 | 10/1990 | Taniura | 359/629 |
| 5,155,623 | 10/1992 | Miller et al. | 359/495 |
| 5,262,888 | 11/1993 | Morishita et al. | 359/245 |
| 5,307,359 | 4/1994 | Sarraf | 372/21 |
| 5,392,140 | 2/1995 | Ezra et al. | 359/619 |
| 5,465,175 | 11/1995 | Woodgate et al. | 359/619 |
| 5,517,359 | 5/1996 | Gelbart | 359/623 |
| 5,521,748 | 5/1996 | Sarraf | 359/321 |
| 5,625,494 | 4/1997 | Fukushima | 359/629 |

FOREIGN PATENT DOCUMENTS 0 635 745  1/1995  European Pat. Off. .

OTHER PUBLICATIONS

"Development of High Speed Shutter Array Using PLZT Ceramics and Application For a Photoprinter", I. Saitoh et al., Minolta Camera Co., Ltd., from Proc. Ninth International Congress on Advances in Non–Impact Printing Technologies / Japan Hardcopy 1993; pp. 226–229.

"High–Speed Light Modulator Arrays"; Aura Ceramics; Oct., 1994; pp. 1–3.

*Primary Examiner*—Loha Ben
*Attorney, Agent, or Firm*—Nelson Adrian Blish

[57] ABSTRACT

A beamsplitter/staggerer (24) for multi-beam laser printers is disclosed. The multi-beam laser printer is comprised of the beamsplitter/staggerer (24), a spatial light modulator (16) having at least two rows of staggered modulator pixel elements (19), and an illumination system comprised of a laser array (10) and an optical system (13) which provides a narrow line of laser light. The beamsplitter/staggerer is adapted to split the narrow line of laser light into at least two parallel lines of light, and to split each of the parallel lines of light into regions, such that substantially all of the light from the illumination system falls onto each of the modulator pixel elements (19) in each of the rows. In one embodiment, the beamsplitter/staggerer comprises a pattern of reflecting areas (26) and transmitting areas (27) wherein a shape of the regions defined by the beamsplitter/staggerer matches a shape of the modulator pixel elements (19).

4 Claims, 8 Drawing Sheets

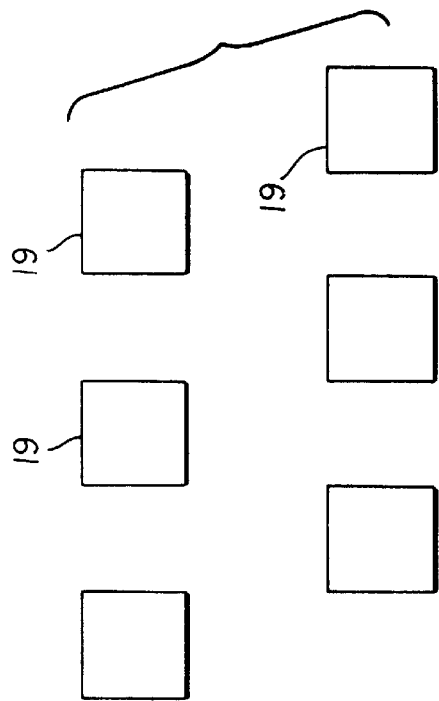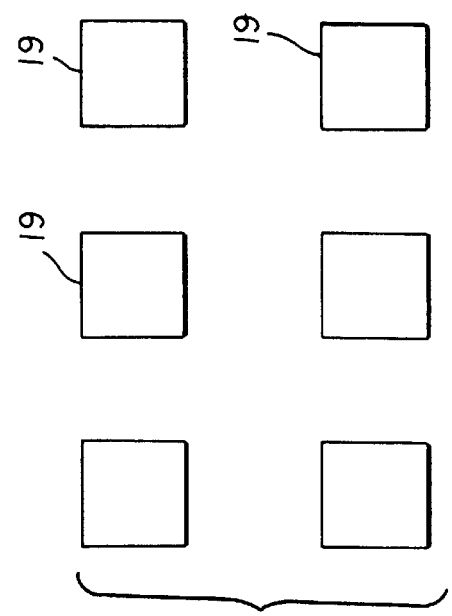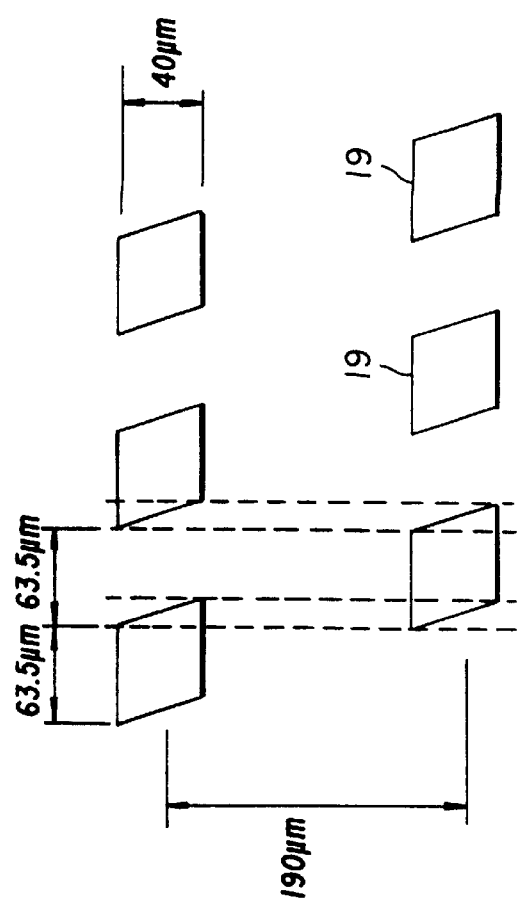

BEAMSPLITTER/STAGGERER FOR MULTI-BEAM LASER PRINTERS

CROSS-REFERENCE TO RELATED APPLICATIONS

This is a continuation-in-part of application Ser. No. 08/427,523; filed Apr. 24, 1995, entitled BEAMSPLITTER FOR LASER MULTI-BEAM PRINTERS AND RECORDERS, now U.S. Pat. No. 5,656,786, issued Jul. 8, 1997.

FIELD OF THE INVENTION

This invention relates generally to laser printers, and more particularly to laser multi-beam printers wherein a beamsplitter/staggerer divides a line of laser light into a plurality of rows and a plurality of regions.

BACKGROUND OF THE INVENTION

In a typical laser printer, modulated radiation from a laser is imaged onto a receiver to produce a desired spot size. The spot is scanned in line and page directions to create a two-dimensional image.

For higher throughput, many discrete lasers are ganged together to form multiple spots on the receiver, and multiple pixels are written simultaneously. The cost of discrete lasers and the loss of efficiency in coupling to fibers has prompted the use of a monolithic array of individually modulated laser elements to produce multiple spots. However, the need to individually modulate each element at high speeds greatly complicates fabrication. The current driver electronics is expensive, the high power capacity of each element makes it more susceptible to thermal and electrical cross-talks, and the failure of even one element in the array makes the array useless.

Commonly assigned U.S. Pat. No. 5,521,748 describes an optical system with a light modulator having a row of elements that are uniformly flood illuminated by light from a diode laser array. This laser array is a series of regularly spaced broad area multi-mode emitters. In this system, each emitter is magnified in the array direction so that it illuminates the full width of the modulator array. As each modulating element is exposed to light from each of the emitters, this overlapping reduces the system sensitivity to the performance of any one emitter by providing redundancy and improved light uniformity. The light from these emitters has a rather low spatial and temporal coherence, which allows the overlapping to occur without introducing significant interference effects. In the cross array direction, the light is controlled by the illumination system so that it is largely contained within the cross array width of the modulator pixel elements. The light illuminating the modulator has been structured as a long narrow line of light, whose length is nominally the length of the entire modulator array, and whose width is nominally the width of a modulator pixel. These pixel elements of the modulator break up the light beam, and each element of the modulator is subsequently imaged on the receiver to form desired size spots; Thus, the image pixel information comes from the modulator, not the laser. U.S. Pat. No. 5,517,359, Gelbart, describes a similar system, which also employs mirror optics to improve the uniformity at the modulator.

FIG. 1a illustrates the pattern of a commercially-available PLZT shutter array modulator. This array has a structure which consists of two parallel rows of active elements. Within a row, these elements are not in immediate contact, but are spaced apart from each other by the width of the elements. This arrangement provides a 50% "fill factor." The second row of elements is displaced from the first, and is staggered, such that the elements in the second row are 90 degrees out of phase spatially with the elements in the first row. Finally, the elements are not a simple shape (as in square or rectangular), but are parallelograms. The layout is illustrated with actual dimensions of the various features, including the 190 $\mu$m offset between the two rows of elements.

Generally, a modulator design with a high fill factor (90–100%) is preferred so as to minimize the light loss between elements when it is flood illuminated. Various modulator technologies are under development that can have rather high fill factors, such as the deformable mirrors devices developed by Texas Instruments. However, few of these modulator technologies have yet demonstrated other highly desired performance characteristics such as modulator speeds in excess of 200 kHz per element, and the ability to handle high power densities (10 kW/cm$^2$). PLZT modulators have demonstrated these abilities successfully, but they may not attain the required high fill factors. It would be desirable to provide the array of FIG. 1a, which attains an effective 100% fill factor.

FIG. 1b shows a modulator pattern consisting of two parallel rows of elements, wherein the elements have a simple rectangular shape, and the two rows of elements are in phase with each other. Such a device has been proposed by Aura Ceramics. FIG. 1c. illustrates a device with square elements, as in FIG. 1b, but with the spatial phase difference of FIG. 1a.

A modulator such as the device of FIG. 1a presents particularly troublesome problems to the optical design of a laser thermal printer when the modulator is flood illuminated. Two offset rows of elements with a complex shape and a 90 degree phase difference is contrary to the natural design of illumination systems that create a single long narrow line of light. While one could illuminate this modulator by flooding the entire area occupied by the two rows of elements, and the gap between them, that would cause an unacceptable loss of light. Optimally, the illumination could be split into two parallel and continuous lines of light, offset by the appropriate gap. However, this too would represent an unacceptable loss of the light that falls between the elements.

It would be desirable to provide beamsplitting means before the modulator to divide the long narrow line of incident flood illumination into two rows of beams, when these two rows are spatially separated in the cross array direction, and the beams within the rows are separated in a regular way in the array direction so as to correspond to the structure of the modulator array. Further, beam shape should be defined by the beamsplitter to correspond to the shape of the pixel elements of the modulator.

U.S. Pat. No. 4,960,320, Tanuira, is directed to a method for splitting a light beam to illuminate a low fill factor modulator array consisting of two rows of modulator pixel elements. These pixel elements are spaced regularly, but with a 50% fill factor for the ratio of pixel size to pixel pitch. The two rows of modulator pixel elements are spatially offset in both the cross array direction and in the array direction, where the rows are spatially out of phase. In this system, an argon laser is used as the light source, which provides a well defined, contained, and coherent beam, particularly as compared to the diode arrays used in the present invention. The Tanuira system uses two beamsplitters, each patterned with coatings, which generally both transmit and reflect portions of the incoming beam. As the input beam for this system is well defined, the multiple beams generated by these beamsplitters are in turn well defined, so they can be then directed onto the modulator without spatially overlapping and mixing. By comparison, if light from the laser diode array was input to the beamsplitter system of Tanuira, the output would consist of two long narrow lines of light, without individually distinguishable beams for each pixel. Furthermore, considerable light would be lost due to misdirection in the first beamsplitter structure of Tanuira.

U.S. Pat. No. 5,155,623, Miller et al., is directed to an apparatus for combining multiple beams originating from one direction, with multiple beam originating from a second direction, so that the multitude travels in a common outgoing parallel direction. The beam combiner is a spatial varying structure, with a surface regularly patterned to transmit or reflect light. The light sources of Miller et al. are arranged in an array fashion, such as with an LED array, or as series of beams derived from a single laser. When the light from these sources arrives at the combiner, these beams are not overlapped, but remain distinct and separate. Furthermore, the beams are undersized relative to the reflective or transmitting areas, and thus the bar pattern does not define the beam sizes. Finally, this combiner does not have its second surface reflectively coated, so it would direct the reflected and transmitted beams in the wrong directions relative to the purposes of this invention.

SUMMARY OF THE INVENTION

It is an object of the present invention to provide a beamsplitter/staggerer for a multi-beam laser printer which overcomes the problems described above.

According to a feature of the present invention, a beamsplitter/staggerer for multi-beam laser printers is comprised of a beamsplitter/staggerer, a spatial light modulator having at least two rows of staggered modulator pixel elements, and an illumination system comprised of a laser array and an optical system which provides a narrow line of laser light. The beamsplitter/staggerer is adapted to split the narrow line of laser light into at least two parallel lines of light, and to split each of the parallel lines of light into regions, such that substantially all of the light from the illumination system falls onto each of the modulator pixel elements in each of the rows. In one embodiment, the beamsplitter / staggerer comprises a pattern of reflecting areas and transmitting areas wherein a shape of the regions defined by the beamsplitter/staggerer matches a shape of the modulator pixel elements.

In one embodiment, optical elements between a laser array and a spatial light modulator modify the light in several ways to make the light optimal for illuminating a spatial light modulator. In particular, light from each emitter is magnified to extend over the full length of the modulator. Thus, each element of the modulator is exposed to light from all emitters, which provides redundancy so that the system is desensitized to the failure of any given emitter. Additionally, as light from all emitters is mixed together, the illumination of the modulator is made more uniform because the spatial light variations within a given emitter, and the power variations from emitter to emitter, are averaged out. The optical elements according to the present invention provide a long, narrow line of illumination, which is optimal for illuminating a linear spatial light modulator consisting of a row of elements spaced closely together.

An illumination method is provided that targets the light onto the two or more rows of elements, without putting light into the gap between the rows, and without putting light in the spaces between the elements. Preferably, the illumination shape matches the complex shape of the modulator pixel elements. The illumination induces minimal angular tilt (nominal normal incidence to the modulator in both rows) to preserve the per-element-Lagrange, and exhibits minimal grating dispersion effects to preserve the per-element-Lagrange and minimize the light loss from "scatter" between the elements.

According to another feature of the present invention, a beamsplitter/staggerer is adapted to split the line of laser light into plural parallel lines of light, and to split the parallel lines of light into regions such that substantially all of the light from the illumination system falls onto the modulator pixel elements of the rows without impinging between the rows or between the modulator pixel elements in the rows.

According to another feature of the present invention, the beamsplitter/staggerer may comprise an alternating array of light-reflective regions and light transmissive regions located on a first surface, and a light reflective region located on a second surface, with the entire structure tilted, such that a first array of beams, which was defined by interaction with a reflective or transmissive bar pattern, is headed directly towards the modulator, while a second array of beams, which was defined by interaction with the alternating transmissive or reflective bar areas, is incident upon the light reflective area of the second surface, and is directed towards the modulator along a path parallel and offset from the first array of beams.

The various beamsplitter structures which are described in the present invention generally consist of a regular spatial pattern of reflecting bars, working with a second reflective area patterned onto a second parallel surface. Light which hits the bars takes one path to the modulator, while light hitting the transmissive regions takes another path. Due to the relatively large Lagrange of the diode laser array source, care must be taken to prevent the beams from spatially overlapping before they reach the modulator. This is accomplished by placing the beamsplitter in proximity to the modulator, or by imaging it onto the modulator.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 1a illustrates the pattern of elements of a commercially-available PLZT shutter array modulator;

FIG. 1b shows another modulator's element pattern;

FIG. 1c shows yet another modulator's element pattern;

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 2A:
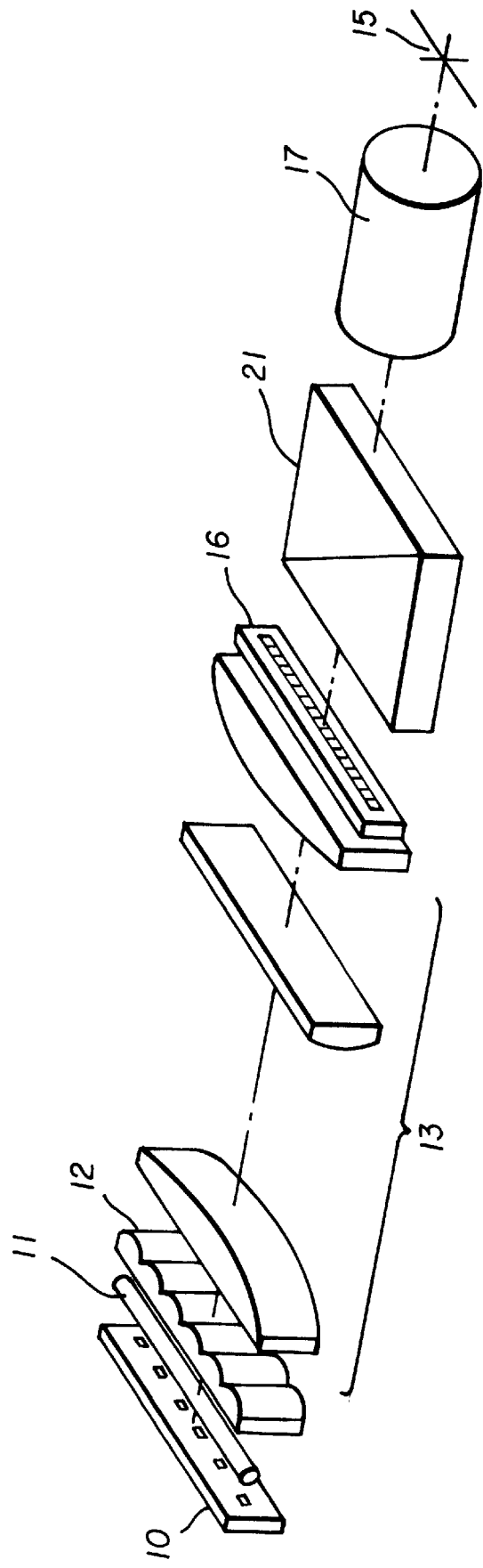
FIG. 2a shows the optical system of a prior art laser printer for a modulator with a single row of high fill factor modulator pixel elements.

FIG. 2a schematically illustrates the modulator illumination optics of a prior art system which has a modulator with a single row of high fill factor modulator pixel elements. Light from a laser array 10 is passed by a lenslet array 12 (either refractive or diffractive) and condensing optics 14 to a modulator 16 having a pattern of modulator pixel elements 19 as shown in FIG. 1a or 1c. The laser emitters are large (typically 150 microns) in the array direction, with a multi-mode incoherent non-Gaussian light output. The optical system should overlap the images of the magnified emitters of laser array 10 onto each other at modulator 16, so as to illuminate the full width of the modulator array. For example, with a modulator consisting of 256 pixels, each 63.5 microns wide, and set on a 127 micron pitch, the illuminated length would be 32.5 mm. In the cross array direction, the optics, which typically include a rod lens 11 immediately adjacent to the laser and other lens elements 13 closer to the modulator, the Gaussian beams from the emitters are focused down to approximately fill the pixels. Thus, for a modulator such as the device of FIG. 1a, the illuminated width would nominally be 40 microns. The modulator is then subsequently imaged through a prism 21 to a light-sensitive receiver at the media plane 15 by the printing lens 17.

Figure 2B:
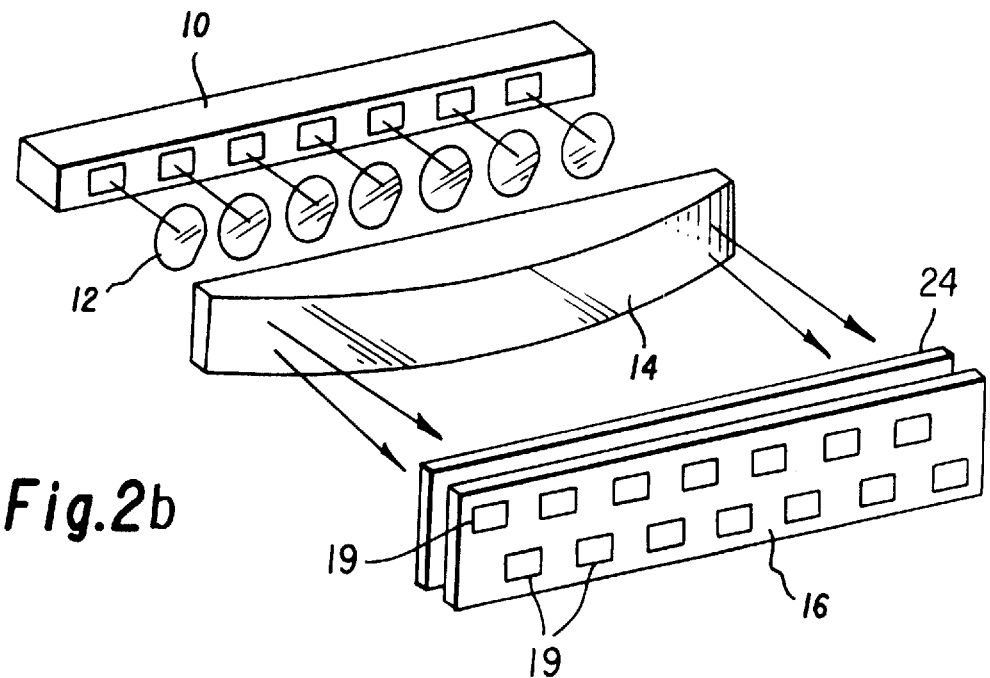
FIG. 2b schematically illustrates the modulator illumination optics of a preferred embodiment of the present invention.

FIG. 2b is a perspective view of the illumination system taking into account a low fill factor modulator array with two parallel rows of modulator pixel elements 19. A beamsplitter/staggerer 24 is typically just before modulator 16. The beamsplitter/staggerer should be in close proximity to the modulator, rather than near the laser array, so as to redirect the already-mixed light. Alternately, the laser emitters can be imaged onto the beamsplitter/staggerer, which in turn, is imaged onto modulator 16.

Figure 2C:
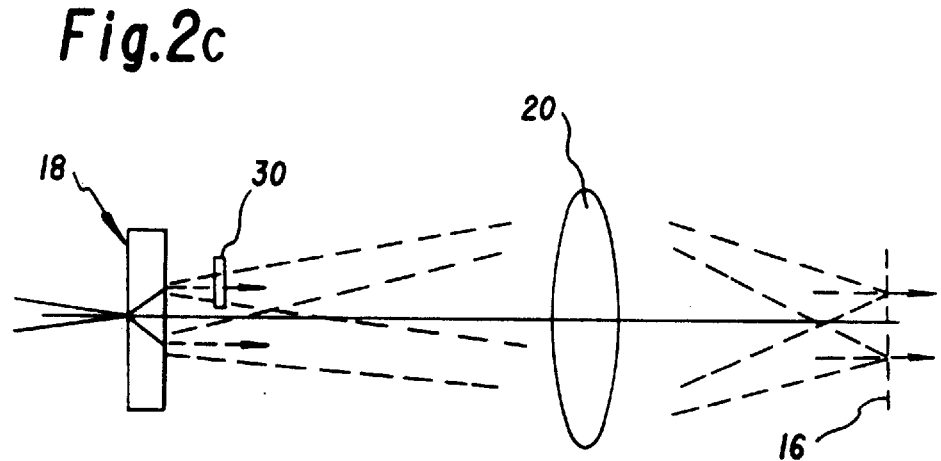
FIG. 2c is a schematic illustration of a beamsplitter/staggerer usable in the optics of FIG. 2b.

FIG. 2c shows a beamsplitter/staggerer 18 which is positioned between condenser optics 14 and modulator 16 of FIG. 2b. Beamsplitter/staggerer 18 is imaged onto modulator 16 by a lens 20. Alternatively, a proximity method could be used without lens 20. The proximity method would be desirable in some embodiments because fewer components are used. It will be understood that, for printing applications, a photosensitive medium would be positioned beyond modulator 16. This media may be placed in close proximity to the modulator, or located at a distance, with a printing lens system in between, which images the modulator sites onto the media.

Figure 3:
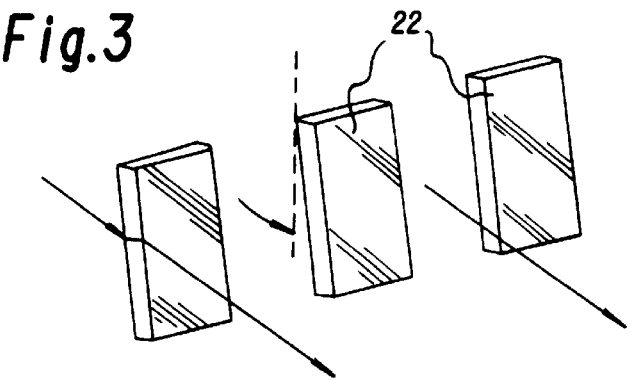
FIG. 3 is a detail view of a portion of one embodiment of the beamsplitter/staggerer of FIG. 2c.

The beamsplitter/staggerer of FIG. 3 is light transmissive, and includes an alternating array of thin tilted glass plates 22 and spaces therebetween. Light passing through the tilted plates is displaced vertically by refraction at the two air/glass surfaces. For example, a 2 mm piece of glass with a refractive index of 1.5 would provide a 190 μm offset with just 0.5 degree of tilt. This device may not be practical for all systems, given the small size (63.5 μm wide) of the glass plates.

Figure 4:
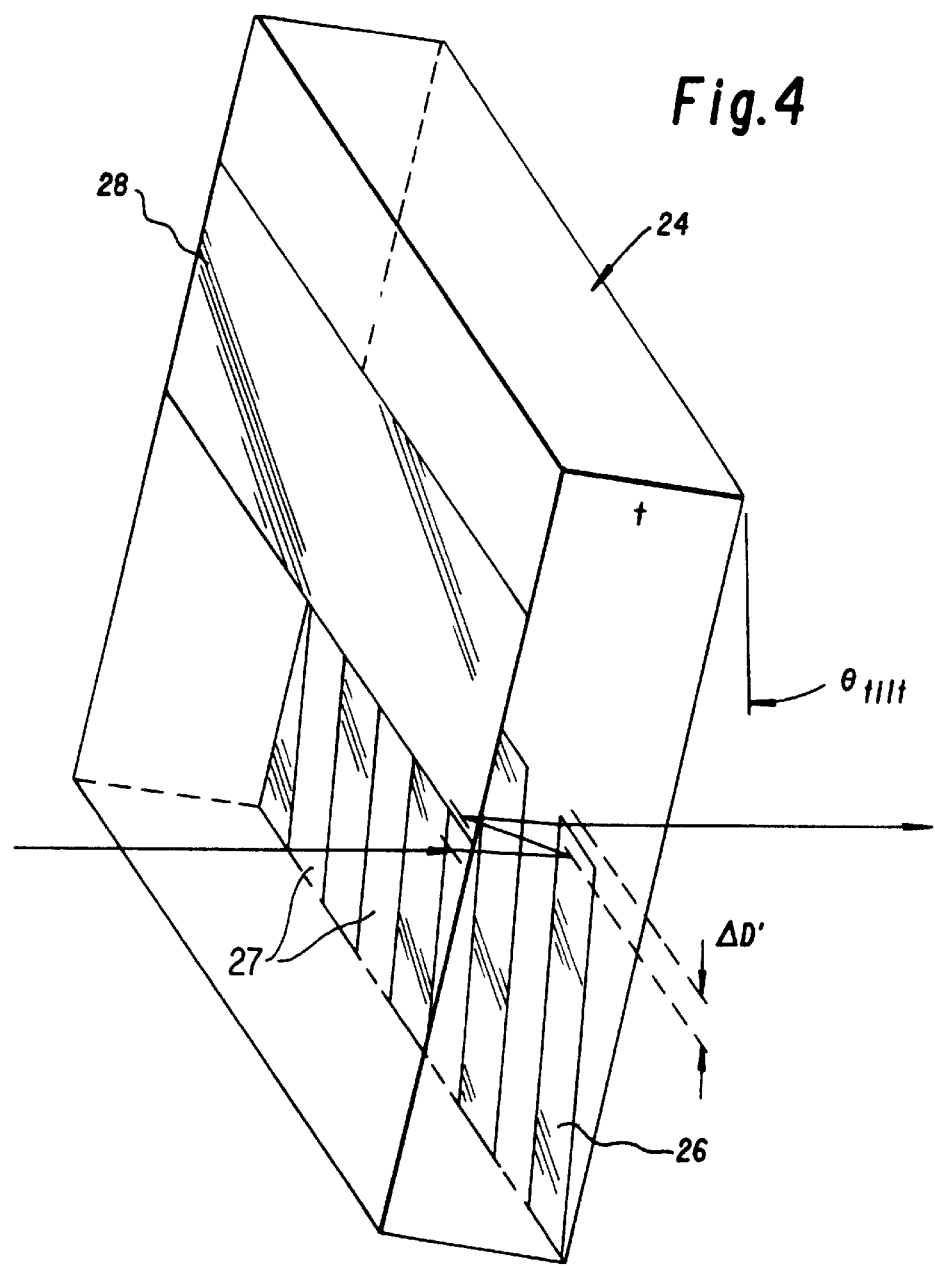
FIG. 4 shows an embodiment of a beamsplitter/staggerer usable in the optics of FIG. 2b.

A more practical "in-line" transmissive beamsplitter/staggerer 24 is shown in FIG. 4. This device is essentially a coarse grating-like structure of high reflectivity mirror bars 26 patterned onto a tilted parallel plate. Light is directed onto this device at a modest incident tilt angle $\theta_{tilt}$. The light which then hits the spaces between mirror bars 26 on the second surface will refract outwards, parallel to but displaced from the input direction. This light will then proceed to the first row of modulator elements. The light which hits mirror bars 26 will be reflected back to the first surface, where it will hit an area mirror 28 and be reflected back towards the modulator; exiting beamsplitter/staggerer 24 parallel to the first beam, but even further displaced. The displacement can be tuned by adjusting the tilt angle $\theta_{tilt}$.

For this device to work, the extent of area mirror 28 and the mirror bars 26 must be precisely controlled. The area mirror must extend far enough to pick up the reflected beam, without obstructing the incoming light. Likewise, the mirror bars must extend far enough to reflect the incoming beam back to the first surface, but not so far that the beam reflected from the first surface is obstructed. Area mirror 28 could alternatively also be a mirror bar pattern, with its bars out of phase spatially with the mirror bars on the second surface.

Figure 4B:
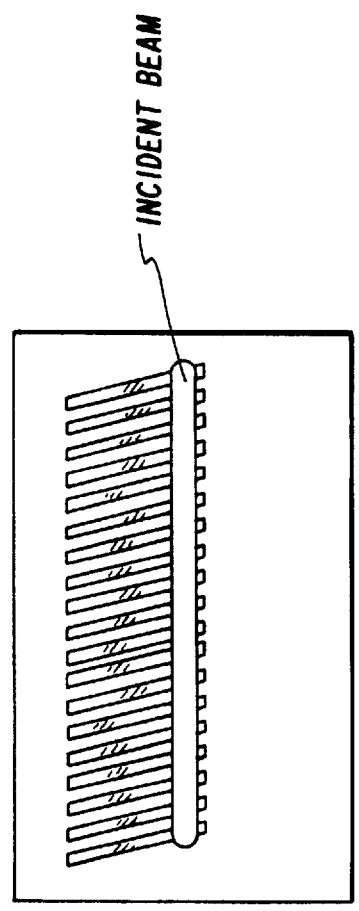
FIG. 4b is a detail illustration similar to FIG. 4a, showing an alternative embodiment.
Figure 4A:
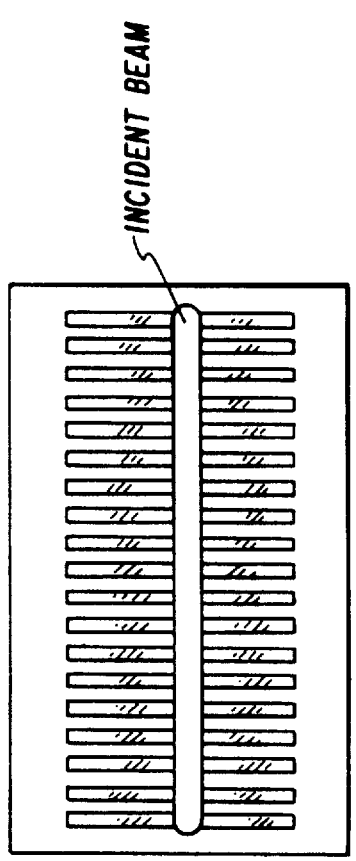
FIG. 4a is a detail illustration of a portion of the beamsplitter/staggerer of FIG. 4.

Mirror bars 26 can be patterned diagonally, as shown in FIG. 4, and in more detail in FIGS. 4a, to be compatible with the modulator element shape of FIG. 1a. For this type modulator, the mirror bars are at an angle of 18.4 degrees relative to the beam. The mirror bars can also be patterned with straight bars, as shown in FIG. 4b, so as to be compatible with the shape of the modulator pixel elements 19 of FIG. 1c. The incident beam in this case (FIG. 4b), would be incident near the end of the mirror bars, not in the middle, as shown. The mirrors can be made with silver, gold, or dielectric coatings. The remaining non-mirrored portions of the first and second surfaces should be AR coated.

Figure 5:
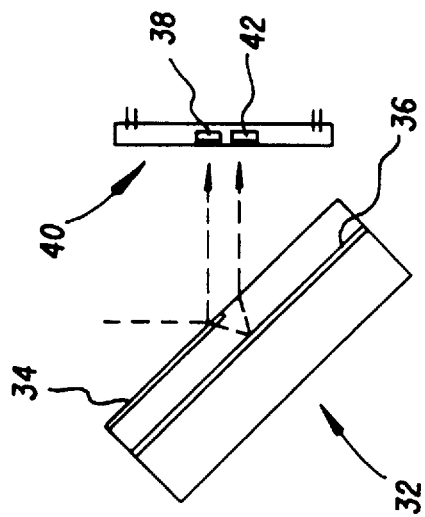
FIG. 5 shows still another embodiment of a beamsplitter/staggerer usable in the optics of FIG. 2b.

Suitable material for the beamsplitter/staggerer of FIG. 5 is 1.0 mm thick fused silica. For an 810 nm laser, a tilt angle $\theta_{tilt}$ of 8.16 degrees provides a 190 μm offset for use with the modulator of FIG. 1a. The path length for the two beams is greatly different (by approximately 2 mm). This would have to be compensated for so that the two beams would both focus at the modulator plane, as otherwise there will be problems with light loss and aberrations. Thus, FIG. 2c shows that the beam path with the shorter path will require a compensator plate 30 in its beam path to account for this difference. This compensator plate could be a separate piece, as shown, or it could be integral with the device.

Referring to FIG. 5, a profile view is shown of a reflective (not "inline") beamsplitter/staggerer 32 which consists of an upper pattern of mirror bars 34 and a lower mirror 36. In this embodiment, light which hits the upper pattern of mirror bars is directed to one row of elements 38 of a modulator 40, while light that hits the lower mirror 36 is directed to a second row of elements 42. In its most straightforward form, light is incident onto the beamsplitter/staggerer at a 45 degree angle. The beamsplitter/staggerer is tilted 45 degrees relative to modulator 40. Light is reflected from the mirror surfaces of the beamsplitter/staggerer and directed onto the modulator at normal incidence. The two parallel mirror planes are offset from each other so as to provide the desired offset (190 μm in the illustrative embodiment) at the modulator. The actual offset between the mirror planes depends on the details of the design of the system.

Other angular combinations of tilt of the mirror planes and incidence onto the mirror planes could be used. For example, in another embodiment, the two mirror planes are parallel to each other. Alternative systems include embodiments wherein the two mirror planes are tilted at different angles. This may be less desirable than other embodiments because the light hitting the modulator elements would no longer be at normal incidence, and the Lagrange, with respect to the printing lens, would be increased.

In its simplest form, mirror bars 34, in the device shown in FIG. 5, would be parallel and oriented laterally perpendicular to the beam, as shown in FIG. 4b. In this case, the incident light could hit anywhere along the bars, as long as mechanical conflict with the modulator is avoided. Such a device works well for a modulator of the FIG. 1c configuration, with square or rectangular elements.

A reflective beamsplitter/staggerer which is configured for a modulator of the FIG. 1a configuration, with parallelogram elements, must be more sophisticated. As with the FIG. 4 system, it must not only have diagonal mirror bars, but bars which are properly designed to allow the light to the other row of modulator elements to pass by unobstructed. As shown in FIG. 5, the lower mirror 36 extends out beyond the end of the upper mirror bars 34, and the light hitting the upper mirror bars is incident just above the end of the upper mirror bars. Thus, the light can reflect from the surface of lower mirror 36 clear of mirror bars 34 to pass unobstructed to the modulator. Upper mirror bars 34 are undercut to allow the light passing to lower mirror 36 to actually pass beneath the upper mirror bars.

Figure 6:
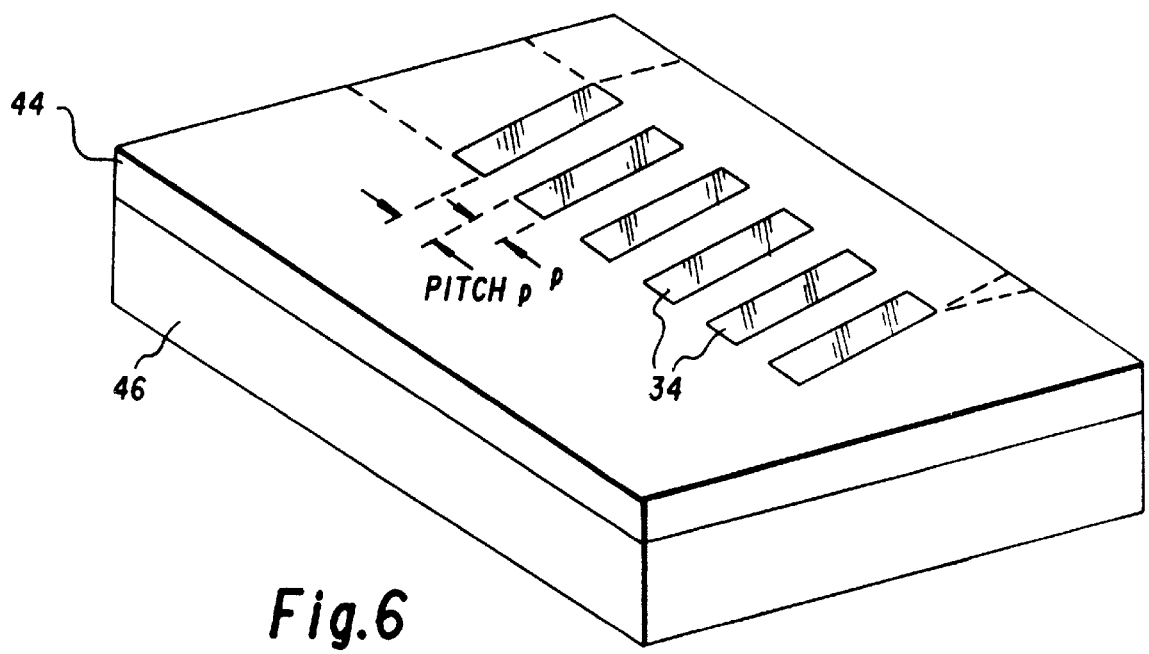
FIG. 6 illustrates a preferred manner of constructing the beamsplitter/staggerer of FIG. 5.

There are several ways in which the beamsplitter/staggerer can be made. FIG. 6 illustrates a version wherein upper mirror bars 34 are patterned coatings on the front face of a mirror bar glass 44. The rest of this front surface is then AR coated. The thickness of mirror bar glass 44 is selected to provide the desired offset between the two beams (190 μm in the illustrative example). For example, for a 810 nm laser incident at 45 degrees, and using BK-7 mirror bar glass with a refractive index of 1.51, mirror bar glass 44 would be approximately 254 μm thick. Mirror bar glass 44 is bonded to a substrate glass 46 to reduce the fragility of the device. Lower mirror 36 is coated to one of the two pieces of glass at the interface between the two. As with the transmissive device of earlier embodiments of the invention, lower mirror 36 can be either an alternating pattern of bars just out of phase with the bars on upper mirror bars 34 or, more simply, an area coating. This device provides the required undercut by having the light to lower mirror 36 passing through the glass underneath upper mirror bars 34.

Figure 7:
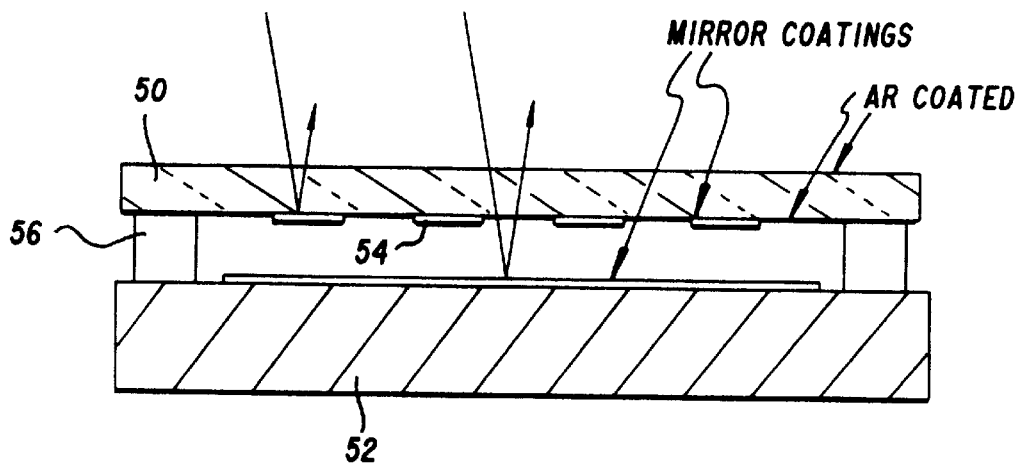
FIG. 7 shows yet another embodiment of a beamsplitter/staggerer usable in the optics of FIG. 2b.

FIG. 7 illustrates another embodiment of the beamsplitter/staggerer wherein a mirror bar glass plate 50 is spaced from a substrate plate 52. A plurality of mirror bars 54 are coated on the inside surface of plate 50, and the airspace (which could be filled with glass or an optical adhesive) between the plates of glass provides the required offset (190 μm in the illustrative embodiment). In this case, the airspace provides the required undercut. The device of FIG. 7 may be better than that of FIG. 6, as it is easier to control the thickness of spacers 56 which separate the plates in FIG. 7, as compared to controlling the thickness of the thin piece of mirror bar glass in FIG. 6.

Figure 8:
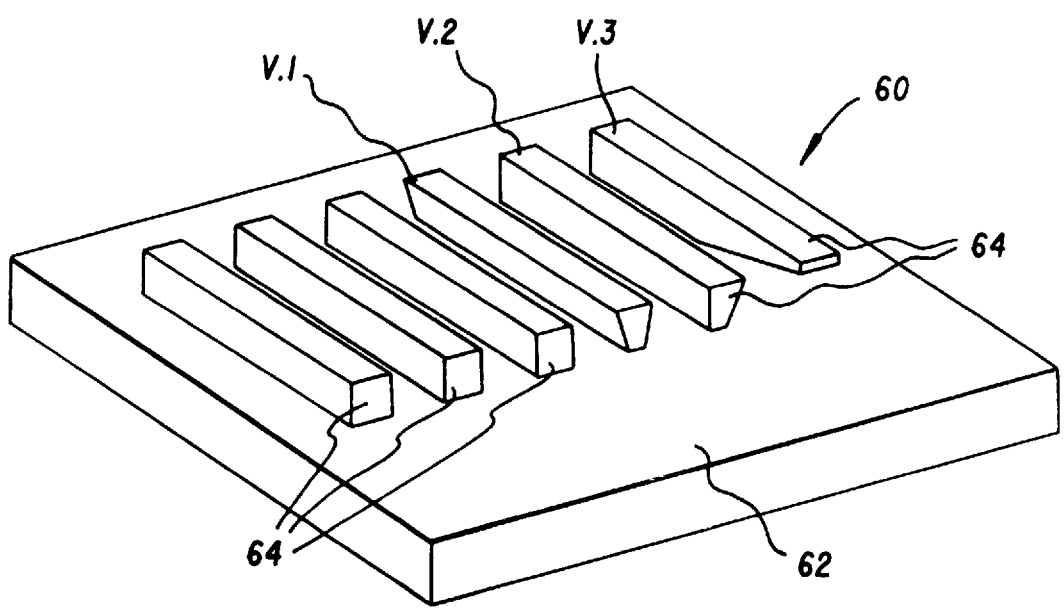
FIG. 8 shows yet another embodiment of a beamsplitter/staggerer usable in the optics of FIG. 2b.

FIG. 8 illustrates yet another alternate version of a beamsplitter/staggerer. In this case, a beamsplitter/staggerer 60 acts like a phase grating, with the lower level 62 and upper level 64 mirror bars formed by a process that creates a series of grooves. Indeed, this beamsplitter/staggerer could potentially be made by cutting or etching grooves directly into a substrate, and then mirror-coating both levels. Alternately, it could be made by building up a structure from the substrate using a photoresist process. While this structure could accommodate the straight elements of the FIG. 1c device, vignetting from light hitting the sides of the grooves might limit the usefulness for the parallelogram type elements of FIG. 1a. Potentially this problem could be overcome by undercutting the upper level bars, as shown by the V.1, V.2, and V.3 bars of FIG. 8. Photoresist processes do allow for some undercutting. Another potential problem is that the quality of the groove cutting or etching would effect the quality of the lower level mirror bars. This technique does have the advantage that the structure does not have to be assembled from multiple components.

Figure 9:
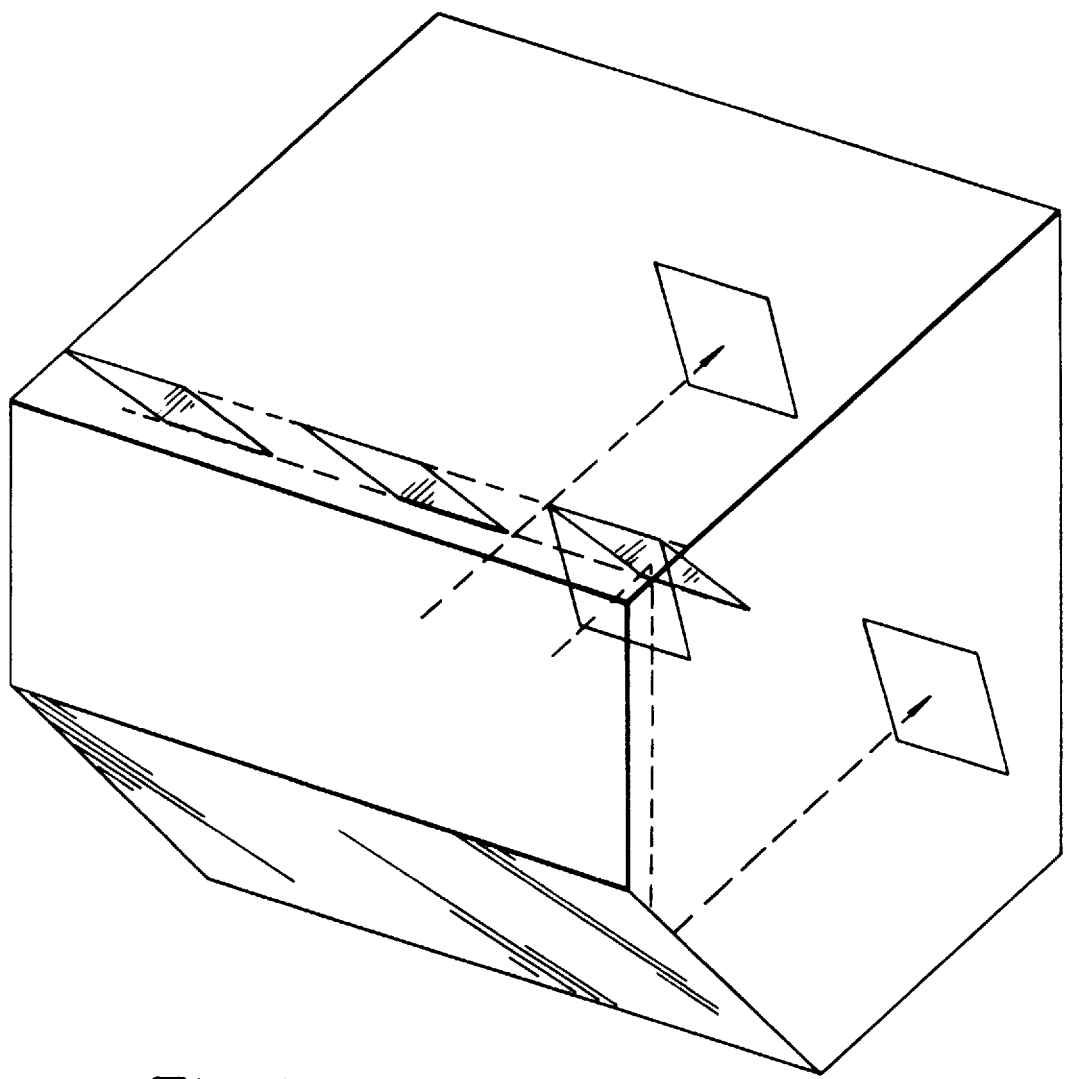
FIG. 9 shows yet another embodiment of a beamsplitter/staggerer usable in the optics of FIG. 2b.

FIG. 9 shows yet another design of a beamsplitter/staggerer according to the present invention. This device is like the device shown in FIG. 4, and uses a patterned set of mirrors to send light to the second channel. The path length difference between the two channels is small enough that the device might be used without a compensator, with only a little light loss occurring from overfilling. Furthermore, this device has a small footprint, which would allow it to be placed in proximity to the modulator.

Beamsplitter/staggerer devices as disclosed herein, in combination with an illumination system which provides a narrow line of laser light, make possible the illumination of a spatial light modulator device which consists of two offset rows of staggered elements. Furthermore, these devices allow the modulator element illumination to be provided in a manner that increases the cross array field of the printing lens that images the light onto the media, without increasing the per-element Lagrange. This increased field is generally not a problem, as the lens must provide sufficient field in the array direction when working with a linear modulator.

The invention has been described in detail with particular reference to preferred embodiments thereof, but it will be understood that variations and modifications can be effected within the spirit and scope of the invention.

| PARTS LIST | |
|---|---|
| 10 | laser array |
| 11 | rod lens |
| 12 | lenslet array |
| 13 | lens elements |
| 14 | condensing optics |
| 15 | media plane |
| 16 | modulator |
| 17 | printing lens |
| 18 | beamsplitter/staggerer |
| 19 | modulator pixel element |
| 20 | lens |
| 21 | prism |
| 22 | glass plates |
| 24 | beamsplitter/staggerer |
| 26 | mirror bars |
| 27 | transmitting areas |
| 34 | upper mirror bars |

-continued

| PARTS LIST | |
|---|---|
| 36 | lower mirror |
| 44 | mirror bar glass |
| 46 | substrate glass |
| 50 | mirror bar glass plate |
| 52 | substrate plate |
| 54 | mirror bars |
| 56 | spacers |
| 60 | beamsplitter/staggerer |
| 62 | lower level |
| 64 | upper level |

What is claimed is:

1. An apparatus comprising:
a spatial light modulator having a plurality of rows of staggered modulator pixel elements;
an illumination system which provides a narrow line of laser light; and
a beamsplitter/staggerer adapted to split the narrow line of laser light into a plurality of parallel lines of light, and to split each of the parallel lines of light into regions, such that substantially all of the light from the illumination system falls onto each of the modulator pixel elements; and
wherein said beamsplitter/staggerer comprises a pattern of reflecting areas and transmitting areas wherein a shape of each of the regions defined by the beamsplitter/staggerer matches a shape of the modulator pixel elements.

2. A beamsplitter/staggerer as set forth in claim 1 wherein the illumination system comprises:
a laser array comprised of a plurality of incoherent emitters; and
optical elements which combine light from each of said emitters wherein each of said modulator pixel elements is exposed to light from all of said emitters.

3. A beamsplitter/staggerer as set forth in claim 1 wherein the beamsplitter/staggerer defining the shape of each of the regions is a parallelogram.

4. A laser printer for exposing image data onto light-sensitive media comprising:
a spatial light modulator having a plurality of rows of pixel elements;
an illumination system which provides a narrow line of laser light comprises of a laser array comprised of a plurality of incoherent emitters positioned to illuminate said modulator;
a beamsplitter/staggerer adapted to split the narrow line of laser light into plural parallel lines of light, and to split each of the parallel lines of light into regions, such that substantially all of the light from the illumination system falls onto the modulator pixel elements;
wherein the beamsplitter/staggerer is comprised of a pattern of reflecting and transmitting areas wherein a shape of the region defined by the beamsplitter/staggerer matches a shape of the modulator pixel elements;
an optical system for directing light from said modulator onto the light-sensitive media; and
control circuitry coupled to said light modulator to control activation of said modulator pixel elements.

* * * * *